United States Patent [19]

Winter

[11] 4,105,646

[45] Aug. 8, 1978

[54] α,β-UNSATURATED SCHIFF-BASE CHAIN EXTENSION REACTIONS FOR HIGH TEMPERATURE POLYMERS

[75] Inventor: Roland A. E. Winter, Armonk, N.Y.

[73] Assignee: Ciba-Geigy Corporation, Ardsley, N.Y.

[21] Appl. No.: 720,181

[22] Filed: Sep. 3, 1976

Related U.S. Application Data

[62] Division of Ser. No. 427,976, Dec. 26, 1973, Pat. No. 3,979,350.

[51] Int. Cl.$^2$ .............................................. C08G 73/12
[52] U.S. Cl. .................................. 528/311; 260/30.2; 260/30.2 N; 260/30.6 R; 260/30.80 S; 260/31.4 R; 260/32.4; 260/32.6 N; 260/33.2 R; 260/33.4 R; 260/33.8 R; 428/426; 428/435; 260/823

[58] Field of Search ............ 260/78 FF, 78 UA, 30.2, 260/30.4 N, 30.6 R, 30.8 DS, 31.4 R, 32.4, 32.6 N, 33.2 R, 33.4 R, 33.8 R, 41 CP, 45, 63 N, 65, 78 UA, 47 UA, 46.5 E; 428/426, 435

[56] References Cited

U.S. PATENT DOCUMENTS

| | | | |
|---|---|---|---|
| 3,432,574 | 3/1969 | Kamal | 260/834 |
| 3,843,602 | 10/1974 | Kruh | 260/47 CP |
| 3,845,018 | 10/1974 | Bilow et al. | 260/47 CP |

*Primary Examiner*—Lester L. Lee
*Attorney, Agent, or Firm*—Luther A. R. Hall

[57] ABSTRACT

This invention provides compositions containing thermally stable prepolymers with azadiene end groups, and compositions containing such prepolymers in combination with dienophiles and the chain-extended and crosslinked polymers obtained from these systems.

The combination of such prepolymers with dienophiles facilitates processing of the prepolymer resin by lowering the softening and curing temperatures under processing conditions.

10 Claims, No Drawings

α,β-UNSATURATED SCHIFF-BASE CHAIN EXTENSION REACTIONS FOR HIGH TEMPERATURE POLYMERS

This is a division of application Ser. No. 427,976 filed on Dec. 26, 1973, now U.S. Pat. No. 3,979,350.

BACKGROUND OF THE INVENTION

Many previously known high temperature polymer resins, including polyimides and polyamideimides, suffer from their inability to be processed at elevated temperatures. These resins are often characterized by their insolubility and infusibility properties which make them practically impossible to process with conventional plastics processing equipment.

In the case of polyimide and polyamide-imide resins, the resins are usually handled in the form of their precursor polyamide acids. But even here, the precursor materials, while suitable for the preparation of thin films prepared from solution, cannot be handled by autoclaving and press molding techniques without great difficulty. The polyamide acid forms of both the polyimide and polyamide-imide resins undergo cyclization to the imide form during processing, giving rise to poorly consolidated and void filled parts of low mechanical strength.

It has now been found that, through the use of prepolymers end capped with azadiene groups or mixtures of such azadiene prepolymers with low melting compounds containing reactive carbon-carbon double bonds, i.e., dienophiles, it is possible to process these materials using conventional plastic processing techniques, such as autoclave and vacuum bag laminating, compression and injection molding. The mixtures of azadiene prepolymers and dienophiles were unexpectedly found to be processable and curable at much lower temperatures than previously reported high temperature prepolymers to yield high strength thermoset resins with negligible void contents. Suitable dienophiles contain one, two or more reactive carbon-carbon double bonds, preferably two double bonds.

DETAILED DISCLOSURE

This invention provides novel resin compositions and methods for chain extension of their low molecular weight prepolymer precursors to yield high molecular weight high temperature polymers.

More particularly, this invention provides compositions containing prepolymers end capped with azadiene groups, either alone or in combination with dienophiles, and the chain extended and cross-linked polymers obtained therefrom. The azadiene end capping is obtained by the condensation of terminal amino groups of the prepolymers with α,β-unsaturated aldehydes or ketones to form α,β-unsaturated Schiff-base end groups. The prepolymers are thus end capped with azadiene groups which undergo addition reactions at elevated temperatures after solvents, water, and other extraneous volatile materials have been removed during processing. These addition reactions lead to chain extension and cross-linking of the base resin. Thus, this invention affords a means whereby low molecular weight precursors can be chain extended to yield high molecular weight high temperature polymers in which no volatile materials or low molecular weight condensation products are evolved. The flow of these resin compositions under processing conditions is sufficient to permit the preparation of dense, low void-content objects of high mechanical strength.

The chain extended and cross-linked resin compositions of this invention are useful as laminating resins, molding resins, adhesives, coatings, especially for structural and electrical purposes, and in monofilament winding applications.

In a first embodiment of this invention, amine terminated oligomeric prepolymers (represented by $R_1$) selected from polyquinoxalines, polybenzimidazoles, polyamides, polybenzoxazoles, polybenzothiazoles, polysulfones, polyimides and polyamide-imides or their corresponding polyamide-acids, other previously disclosed high temperature polymer backbones or certain diprimary diamines, are end capped with azadiene groups to yield novel high temperature prepolymers represented by the formula

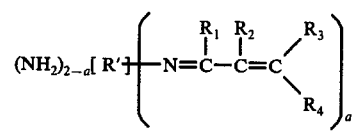

wherein

R' is a high temperature prepolymer backbone, as previously defined, $R_1$, $R_2$, $R_3$ and $R_4$ are independently hydrogen or a monovalent aliphatic, cycloaliphatic, aromatic or heterocyclic radical or a combination of such radicals, and $a$ is a number from 0.1 to 2.

$R_1$, $R_2$, $R_3$ and $R_4$ are preferably hydrogen, phenyl or methyl.

In this embodiment, the azadiene terminated prepolymers are merely heated to initiate polyaddition reactions of neighboring azadiene groups, yielding novel high temperature polymers.

Particularly useful high temperature prepolymers of this invention are derived from aromatic diamines, and amine terminated polyimide and polyamide-imide prepolymers. Among the factors contributing to the special usefulness of these prepolymers are their outstanding performance, commercial accessibility, and economic importance.

These azadiene capped prepolymers include a polyamide-acid of the formula

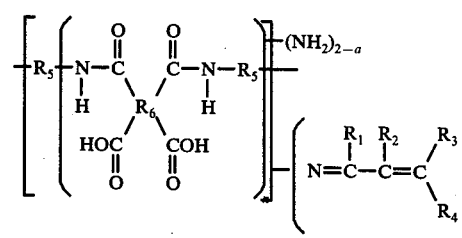

and its corresponding polyimide of the formula

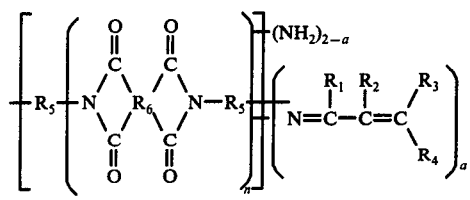

as well as polyamide-amide acids of the formula

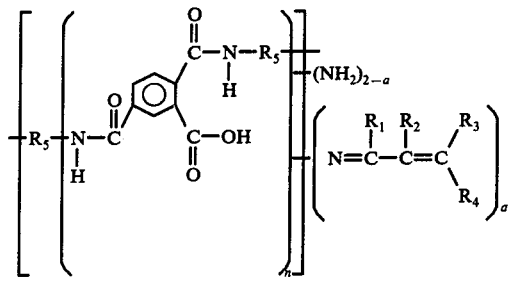

and

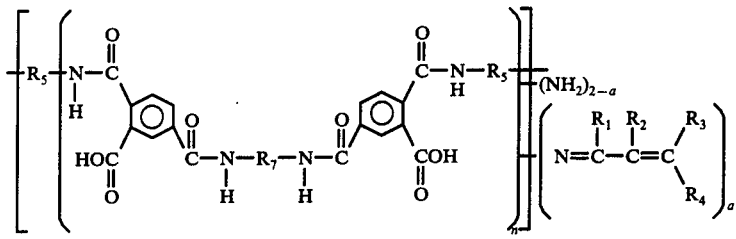

and their respective corresponding polyamide-imides of the formulas

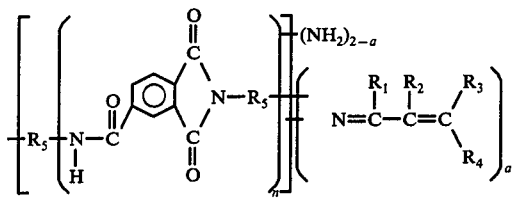

and

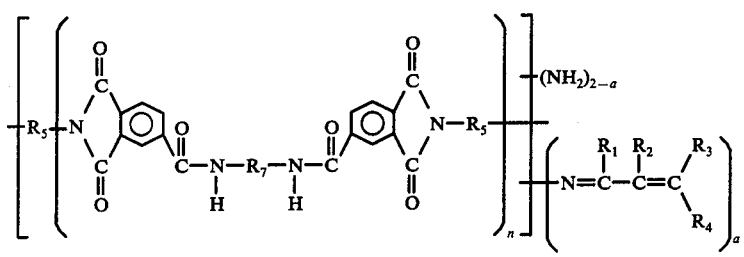

wherein
 n is a number from 1 to 20, preferably from 1 to 5;
 a is a number from 0.1 to 2; and
 $R_5$ and $R_7$ are the same or different and each is a divalent organic radical containing from 2 to 30 carbon atoms and selected from aromatic, aliphatic, alkyl-aromatic, cycloaliphatic and heterocyclic radicals, combinations of these, and radicals with hetero-atom containing bridging groups where the heteroatom in the bridge is oxygen, sulfur, nitrogen, phosphorus or silicon;
 $R_6$ is a tetravalent aliphatic, cycloaliphatic, aromatic, or heterocyclic radical and contains at least two carbon atoms; and
 $R_1$, $R_2$, $R_3$ and $R_4$ are as previously defined herein.

The radicals $R_5$ and $R_7$ are divalent organic radicals derived from diprimary amines. More particularly, the divalent organic radicals as represented by $R_5$ and $R_7$ are alkylene groups containing from 2 to 12 carbon atoms; cycloalkylene groups containing from 4 to 6 carbon atoms; a xylylene group, arylene groups selected from ortho, meta or para phenylene, xylene, tolylene, biphenylene, naphthylene or anthrylene; a substituted arylene group of the formula

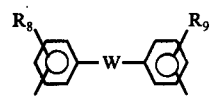

wherein W is a covalent bond, sulfur, carbonyl, —NH, —N-(lower)alkyl, O, S, SS, —N-phenyl, sulfonyl, a linear or branched alkylene group of from 1 to 3 carbon atoms; a

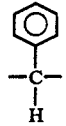

group; arylene, especially phenylene group; a dialkyl or diaryl silyl group;

(lower)alkyl, said lower alkyl containing from 1 to 5 carbon atoms; —N=N—; or

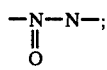

$R_8$ and $R_9$ are independent and each is hydrogen; halogen; especially chloro or bromo; lower alkyl of from 1 to 5 carbon atoms, especially methyl; lower alkoxy containing from 1 to 5 carbon atoms, especially methoxy; aryl, especially phenyl; a group having the formula

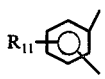

wherein $R_{11}$ is hydrogen, halogen or lower alkyl of from 1 to 5 carbon atoms; or a group having the formula

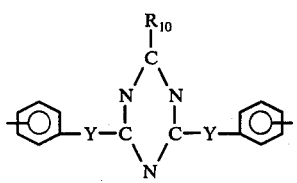

wherein Y is a covalent bond or NH— and $R_{10}$ is phenyl, piperidino, H, diphenylamino, or a di(lower alkyl)amino group.

More preferably, $R_5$ and $R_7$ embrace groups which are derived from the aromatic diamines disclosed in the immediately preceding paragraph. Most preferably, $R_5$ and $R_7$ are a group having the formula

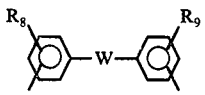

wherein W is a covalent bond, methylene, a

group, sulfur, oxygen, or sulfone, and $R_8$ and $R_9$ are independently hydrogen, halogen, or lower alkyl of from 1 to 5 carbon atoms, especially methyl, or a group having the formula

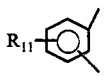

wherein $R_{11}$ is hydrogen, halogen or lower alkyl of from 1 to 5 carbon atoms, especially methyl.

Among the diprimary diamines from which the radicals $R_5$ and $R_7$ are derived are the following:

ethylenediamine
m-phenylenediamine
4-chloro-m-phenylenediamine
p-phenylenediamine
4,4'-diaminodiphenylpropane
4,4'-diaminodiphenylmethane
3,3'-diaminodiphenylmethane
benzidine
4,4'-diaminodiphenylsulfide
4,4'-diaminodiphenylsulfone
3,3'-diaminodiphenylsulfone
4,4'-diaminodiphenyl ether
4,4'-diaminobenzophenone
bis-(4-aminophenyl)-N-methylamine
1,5-diaminonaphthalene
3,3'-dimethyl-4,4'-diaminobiphenyl
3,3'-dimethoxybenzidine
toluenediamine
4,4'-methylene bis(o-chloroaniline)
methylene bis(o-methoxyaniline)
methylene bis(o-methylaniline)
m-xylylenediamine
p-xylylenediamine
bis-(4-aminocyclohexyl)-methane
hexamethylenediamine
heptamethylenediamine
octamethylenediamine
nonamethylenediamine
decamethylenediamine
3-methyl-heptamethylenediamine
4,4'-dimethylheptamethylenediamine
2,12-diaminododecane
2,2-dimethylpropylenediamine
3-methoxyhexamethylenediamine
4,4'-(p-aminophenyl)disulfide
2,5-dimethylhexamethylenediamine
2,5-dimethylheptamethylenediamine
5-methylnonamethylenediamine
1,4-diaminocyclohexane
1,12-diaminooctadecane
2,5-diamino-1,3,4-oxadizaole
$H_2N(CH_2)_3O(CH_2)_2O(CH_2)_3NH_2$
$H_2N(CH_2)_3S(CH_2)_3NH_2$
$H_2N(CH_2)_3N(CH_3)(CH_2)_3NH_2$
2-diphenylamino-4,6-bis(m-aminoanilino)-s-triazine
2-amino-4,6-bis(m-aminoanilino)-s-triazine
2-phenyl-4,6-bis(p-aminophenyl)-s-triazine
2-phenyl-4,6-bis(m-aminophenyl)-s-triazine
2-phenyl-4,6-bis(4'-aminoanilino)-s-triazine
2-phenyl-4,6-bis(3'-aminoanilino)-s-triazine
2-anilino-4,6-bis(4'-aminoanilino)-s-triazine
2-(N-methylanilino)-4,6-bis(3'-aminoanilino)-s-triazine
2-dimethylamino-4,6-bis(3'-aminoanilino)-s-triazine
2-diphenylamino-4,6-bis(2'-aminoanilino)-s-triazine
2-diphenylamino-4,6-bis(4'-aminoanilino)-s-triazine
2-phenyl-4,6-bis(2'-methyl-4'-aminoanilino)-s-triazine
2-diphenylamino-4,6-bis(3'-aminocyclohexylamino)-s-triazine
2-piperidino-4,6-bis(3'-aminoanilino)-s-triazine
2,4-bis(3'-aminoanilino)-s-triazine
2-amino-4,6-bis(3'-aminoanilino)-s-triazine
2-diphenylamino-4,6-bis{4-(p-aminophenoxy)anilino}-s-triazine.

More particularly, $R_6$ is derived from a dianhydride characterized by the general formula

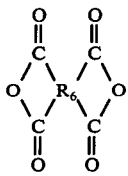

and may be straight or branched chain saturated aliphatic radical having at least two carbon atoms, and preferably from 2 to 10 carbon atoms; a saturated alicyclic radical preferably having 5 to 12 carbon atoms in the ring; a heterocyclic radical containing at least one of the atoms of O, N, and S; and an aromatic group containing at least one ring of six carbon atoms, said ring characterized by benzenoid unsaturation, the four carbonyl groups being attached directly to separate carbon atoms of the aromatic radical and the carbonyl groups being ortho or peri to each other so that 5- or 6-membered anhydride rings are formed respectively. The $R_6$ groups may be characterized by the following structures:

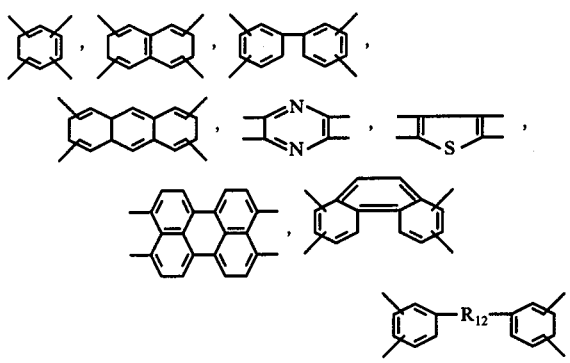

wherein $R_{12}$ is selected from the group consisting of

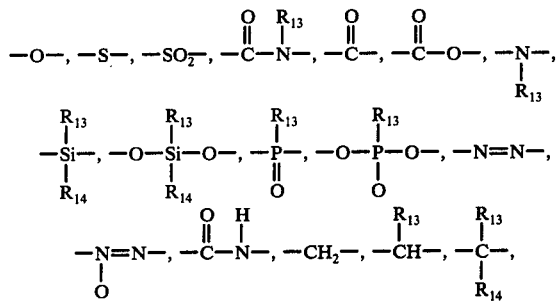

and phenylene, wherein $R_{13}$ and $R_{14}$ are alkyl, preferably of from 1 to 6 carbon atoms, or aryl, and substituted groups thereof, or the structure

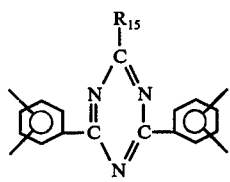

wherein $R_{15}$ is hydrogen, aryl such as phenyl and naphthyl; amino, diarylamino such as diphenylamino, dialkylamino such as dimethyl or diethylamino and the like.

These latter type triazine based dianhydrides are described in greater detail in an application filed on May 1, 1972, Ser. No. 248,838 (Case GC 600).

The preferred aromatic dianhydrides are those in which the carbon atoms of each pair of carbonyl groups are directly attached to ortho carbon atoms in the $R_6$ group to provide a five-membered ring as follows:

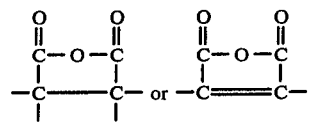

Suitable dianhydrides that are useful in this invention are, among others:

1,2,4,5-benzenetetracarboxylic dianhydride
1,2,3,4-benzenetetracarboxylic dianhydride
2,3,6,7-naphthylenetetracarboxylic dianhydride
3,3'4,4'-diphenyltetracarboxylic dianhydride
1,2,5,6-naphthalenetetracarboxylic dianhydride
2,2',3,3'-diphenyltetracarboxylic dianhydride
2,2-bis-(3,4-dicarboxyphenyl)propane dianhydride
bis-(3,4-dicarboxyphenyl)sulfone dianhydride
3,4,9,10-perylenetetracarboxylic dianhydride
bis-(3,4-dicarboxyphenyl)ether dianhydride
ethylenetetracarboxylic dianhydride
naphthalene-1,2,4,5-tetracarboxylic dianhydride
naphthalene-1,4,5,8-tetracarboxylic dianhydride
decahydronaphthalene-1,4,5,8-tetracarboxylic dianhydride
4,8-dimethyl-1,2,3,5,6,7-hexahydronaphthalene-1,2,5,6-tetracarboxylic dianhydride
2,6-dichloronaphthalene-1,4,5,8-tetracarboxylic dianhydride
2,7-dichloronaphthalene-1,4,5,8-tetracarboxylic dianhydride
2,3,6,7-tetrachloronaphthalene-1,4,5,8-tetracarboxylic dianhydride
phenanthrene-1,8,9,10-tetracarboxylic dianhydride
cyclopentane-1,2,3,4-tetracarboxylic dianhydride
pyrrolidine-2,3,5,6-tetracarboxylic dianhydride
pyrazine-2,3,5,6-tetracarboxylic dianhydride
2,2-bis-(2,5-dicarboxyphenyl)propane dianhydride
1,1-bis-(2,3-dicarboxyphenyl)ethane dianhydride
bis-(2,3-dicarboxyphenyl)methane dianhydride
bis-(3,4-dicarboxyphenyl)methane dianhydride
bis-(3,4-dicarboxyphenyl)sulfone dianhydride
1,2,3,4-butanetetracarboxylic dianhydride
thiophene-2,3,4,5-tetracarboxylic dianhydride
3,3',4,4'-diphenyltetracarboxylic dianhydride
3,4,3',4'-benzophenonetetracarboxylic dianhydride
azobenzenetetracarboxylic dianhydride
2,3,4,5-tetrahydrofuran dianhydride
2-phenyl-4,6-bis(3',4'-dicarboxyphenyl)-s-triazine dianhydride
2-diphenylamino-4,6-bis(3',4'-dicarboxyphenyl)-s-triazine dianhydride.

The α,β-unsaturated aldehydes and ketones of this invention have the general formula

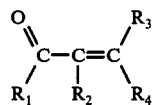 VIII wherein $R_1$, $R_2$, $R_3$ and $R_4$ are as previously defined. The special usefulness of these α,β-unsaturated aldehydes and ketones in the addition reactions of this invention is attributable to the conjugated

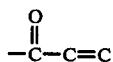

system.

Among the α,β-unsaturated aldehydes and ketones of formula VIII suitable in this invention are the following:

acrolein
trans-cinnamaldehyde
crotonaldehyde
4-dimethylaminocinnamaldehyde
β-(2-furyl)acrolein
trans-2-hexenal
methacrolein
α-methylcinnamaldehyde
o-nitrocinnamaldehyde
β-phenylcinnamaldehyde
hexahydrocinnamaldehyde
mesityl oxide
4-methoxy-3-buten-2-one
3-methyl-3-penten-2-one
3-penten-2-one
benzalacetophenone
benzalacetone
methyl vinyl ketone.

As previously mentioned, the reaction of these α,β-unsaturated aldehydes and ketones with an amino group produces a Schiff-base structure. General methods of preparation of Schiff bases are disclosed in Houben-Weyl, Methoden des Organischen Chemie, Volume 11/2 (1958) page 73 ff; and e.g., J. Am. Chem. Soc., 84, 3673 (1962).

The polyamide-acids of formula II may be prepared by reacting, generally at between 20° C and 120° C in an anhydrous polar solvent such as dimethylformamide, dimethylacetamide, dimethylsulfoxide, N-methylpyrrolidone or pyridine, a dianhydride or mixture of dianhydrides with an excess of diprimary diamine or a mixture of diprimary diamines as hereinbefore defined so as to obtain a polyamide acid solution having terminal —$NH_2$ groupings

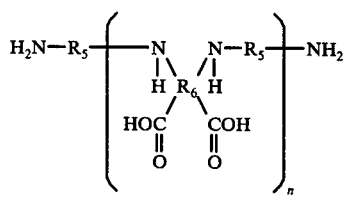

and then reacting, generally between 0° C and reflux temperatures, preferably from 20° to 120°, the solution thus obtained with an α,β-unsaturated aldehyde or ketone to yield the azadiene ene capped polyamide-acids of this invention.

The preparation of the polyamide-acids of formula II is described in greater detail in U.S. Pat. Nos. 3,575,924 and 3,528,950.

The polyamide-amide acids of formula IV may be prepared by reacting trimellitic anhydride or a derivative thereof, such as for example the acid chloride with an excess of a diprimary diamine or mixture of diprimary diamines as hereinbefore defined, in an anhydrous polar solvent such as dimethylformamide, N,N-dimethylacetamide, dimethylsulfoxide, N-methylpyrrolidone or pyridine so as to obtain a polyamideamide acid solution having terminal —$NH_2$ groupings

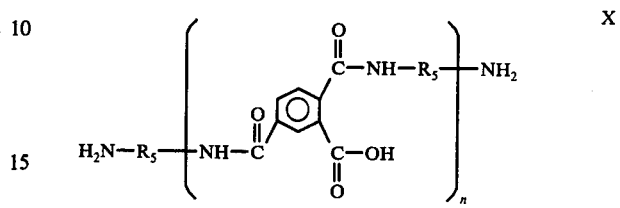

and then reacting, generally at between 0° and reflux temperature; preferably from 20° to 120° C, the solution thus obtained with an α,β-unsaturated aldehyde or ketone to yield the azadiene end capped polyamide-amide acids of this invention.

The preparation of the polyamide amide acids of formula IV is described in greater detail in German Patent 2,120,021.

The polyamide-amide acids of formula V may be prepared by reacting an amide dianhydride of the formula

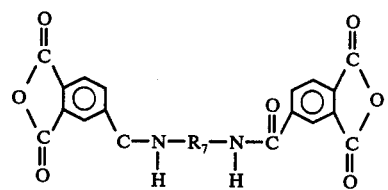

wherein $R_7$ is as defined hereinbefore, with a molar excess of a diprimary diamine as defined hereinbefore in an anhydrous polar solvent such as dimethylformamide, dimethylacetamide, dimethylsulfoxide, N-methylpyrrolidone to obtain a polyamide-amide acid solution having terminal —$NH_2$ groupings

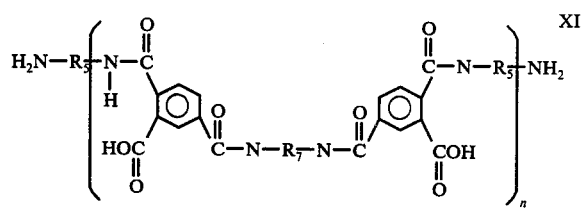

and then reacting, generally at between 0° and reflux temperature; preferably from 20° to 120° C the solution thus obtained with an α,β-unsaturated aldehyde or ketone to yield the azadiene end capped polyamide-amide acids of this invention.

$n$ in formulas IX, X and XI is a number from 1 to 20, preferably from 1 to 5.

The preparation of the polyamide-amide acid of formula V is described in greater detail in the copending application Ser. No. 248,838.

Prepolymers of this invention have solubility in organic solvents such as:

N,N-dimethylformamide

N,N-dimethylacetamide
N-methyl-2-pyrrolidone
N,N-diethylformamide
N,N-diethylacetamide
N-methylcaprolactam
dioxane
dimethylsulfoxide
tetramethylurea
pyridine
dimethylsulfone
hexamethylphosphoramide
tetramethylene sulfone
formamide
N-methylformamide
γ-butyrolactone
tetrahydrofuran
m-cresol
2-methoxyethyl acetate
1,2-dimethoxyethane
bis(2-methoxyethyl) ether
chloroform
nitrobenzene.

The solvents can be used alone, in combinations of solvents, or in combination with solvents such as benzene, xylene, toluene and cyclohexane.

The conversion of the polyamide acid precursors of formulas II, IV and V into their corresponding polyimides of formula III and polyamide-imides of formulas VI and VII, respectively, may be effected by thermal and/or chemical means. Thus, the polyamide-acid resin precursors may be subjected to a cyclizing dehydration which consists of treating the resin with a dehydrating agent such as acetic anhydride alone or in combination with a tertiary amine catalyst such as pyridine or heating the precursor resins between 80° C and 180° C.

Under the first embodiment of this invention are also included azadiene capped divalent organic radicals, which are obtained by reacting the previously disclosed diprimary amines with α,β-unsaturated aldehydes or ketones. This reaction can be conveniently carried out by dissolving the diamine in an appropriate solvent and by adding to this solution a solution of the aldehyde or ketone in the same solvent. After refluxing for a short period, as for example for 1 to 3 hours, and separating away the solvent, the azadiene capped organic radical is obtained.

In a second embodiment of the invention, the previously described azadiene prepolymers of formula I are reacted with dienophiles which include a compound of the formula

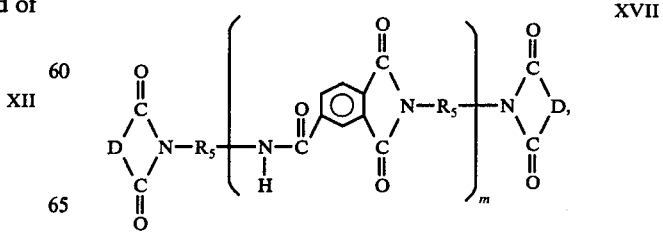

XII a polyamide-acid of the formula

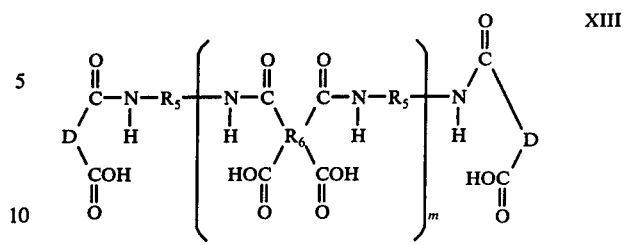

XIII and its corresponding polyimide of the formula

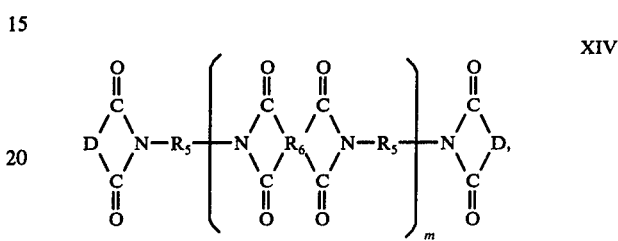

XIV as well as a polyamide-amide acid of the formula

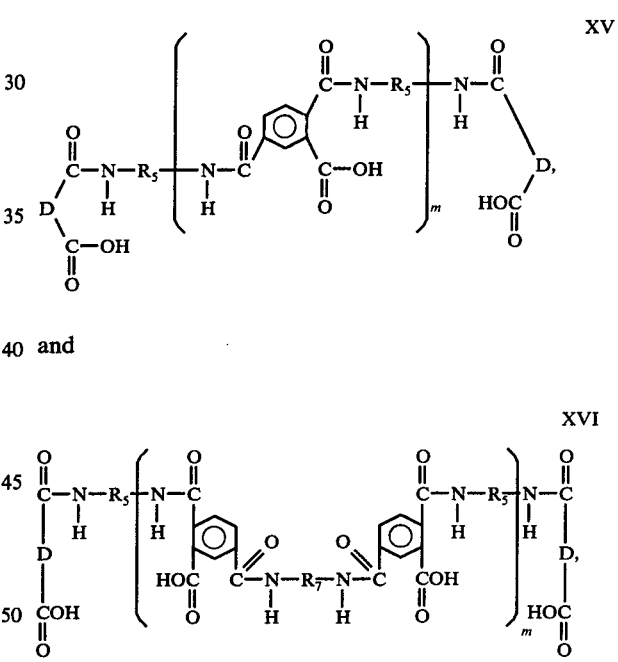

XV and

XVI and their respective corresponding polyamide-imides of the formulas

XVII and

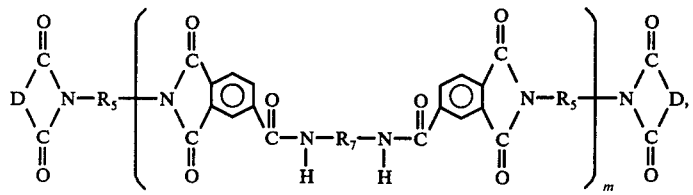

XVIII wherein
R$_5$, R$_6$ and R$_7$ are as previously defined,
m is a number from 1 to 20, preferably from 1 to 5, and,
D is a divalent radical containing olefinic unsaturation selected from a group having the formula

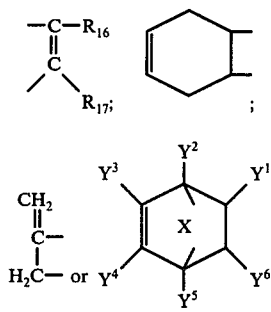

wherein
R$_{16}$ is hydrogen, methyl, bromo or chloro;
R$_{17}$ is hydrogen, bromo or chloro;
Y$^1$–Y$^6$ inclusive is selected from the group consisting of hydrogen, bromine, chlorine, nitro, phenyl, alkyl of from 1 to 6 carbon atoms;
X is carbonyl, oxygen, sulfur, chloro or bromo substituted methylene, alkylidene of from 1 to 6 carbon atoms, and benzylidene.

The radical D is derived from an ethylenically unsaturated anhydride of the formula

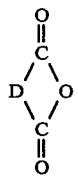

XIX wherein D is as defined hereinbefore, which may be, for example, maleic anhydride, citraconic anhydride, chloro maleic anhydride, dichloro maleic anhydride, bromo maleic anhydride and the like; and the product of a Diels-Alder reaction between a cyclic diene of the formula:

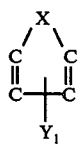

and an anhydride of the formula

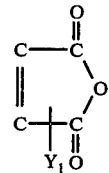

wherein X and Y$_1$ are as defined above, for example, nadic anhydride and methyl nadic anhydride.

In this embodiment the bis azadienes of formula I are mixed with bis-dienophiles of formulas XII to XVIII in a molar ratio of from about 1:1 to about 1:10, preferably from about 1:1 to 1:5, and reacted together in solution or in the melt. The reaction is carried out at temperatures of from 0° C to 350° C, but is preferably conducted in the temperature range of from approximately 100° C to 300° C.

Bis-dienophiles of formula XII can be obtained by the procedure given in U.S. Pat. No. 2,444,536. Additional exemplification is presented in examples 1 to 4 of patent application GC 614, filed Nov. 2, 1972.

Bis-dienophiles of formulas XIII to XVIII where m is greater than zero can be obtained by first preparing the amino-terminated compounds of formulas IX to XI and then reacting, generally between 0° C and 100° C, the solution thus obtained with an unsaturated anhydride of formula XIX. Imidization can be achieved as previously described for the azadiene capped prepolymers.

Mixtures of these bis-azadienes and bis-dienophiles have particular utility, as molding resins and in laminating applications, e.g., circuit boards, where high melt flows at temperatures of 150° to 175° C are required. These resins still yield fabricated objects with low void contents and high temperature mechanical and electrical properties.

In the variation where n is from 1 to 5 in structure III, mixtures of prepolymer III and bis-dienophile XII yield laminating resins with excellent long term oxidative stability at elevated temperatures. These resins melt flow in the temperature range of 150° to 175° C and can be processed as glass, boron, graphite or polyamide fiber reinforced composites at the economically attractive processing temperatures and pressures normally used for epoxy and polyester resins, which have much lower mechanical strength and rigidity above 250° C.

The azadiene terminated prepolymers and bis-dienophile mixtures of this invention are soluble in low boiling solvents at high concentrations in the completely ring closed form, and upon curing do not generate volatile by-products. They therefore can be applied as laminating varnishes or coatings and can be fabricated to yield void free and blister free composites and films.

Prepregs containing these prepolymers and dienophile mixtures are useful for the fabrication of large and complex structural parts containing void free composites and bonded structures. The fabrication could be carried out by the use of inexpensive and disposable nylon vacuum bags with or without the pressure assist of autoclaves that in typical aircraft production are operated below 400° F and 200 psi pressure in the case of epoxy resins.

Previous attempts to use "state of the art" high temperature polymers in these applications invariably resulted in the production of composites containing voids which lowered the high temperature strength and oxidative stability of the finished part. Unlike the resins of this invention, the "state of the art" high temperature polymers suffer from the following processing disadvantages:

(1) They cannot be obtained in low boiling solvents as soluble ring closed prepolymers and therefore evolve solvent residues and condensation products during cure which results in composites of high void content.

(2) Their precursors will not melt below 400° F.

(3) Their prepolymers will not chain extend or cross-link by an addition mechanism commencing only after solvent removal is complete and the prepolymer has melted.

Applications of the azadiene terminated prepolymers and bis-dienophiles of this invention as laminating resins, molding resins, hot melt adhesives, coatings, and in monofilament winding uses are visualized whereever high temperature mechanical strength and oxidative stability is a requirement.

Other appropriate ingredients may be added to the compositions of this invention such as fillers, dyes, pigments, thermal and UV stabilizers and the like, depending on the end use.

To further illustrate the nature of this invention and the process employed in preparing the chain extended and cross-linked resins, the following examples are given below.

EXAMPLE 1

A mixture of equimolar quantities of N-phenyl maleimide (MW 173.2) and N-cinnamalaniline (MW 207.3) was heated at 200° C for 15 minutes. Mass spectrometric analysis of the product showed a molecular ion peak at m/e = 380 in agreement with formation of a 1:1 adduct (calculated m/e — 380). The number average molecular weight of the product determined by osmometric measurements was 416. Nuclear magnetic resonance spectra indicated that the vinylene group in N-phenylmaleimide had disappeared.

A mixture of equimolar amounts of N-phenylmaleimide and N,N'-biscinnamal 4,4'-methylene dianiline is converted into a cross-linked resin on heating at 250° C for 20 minutes.

EXAMPLE 2

N,N'-Biscinnamal-4,4'-methylene Dianiline

To a solution of 198.2 g (1 mole) of 4,4'-methylene dianiline in 2000 ml of ethanol was added a solution of 277.6 g (2.1 moles) of trans-cinnamaldehyde in 500 ml of ethanol over a 2 minute period. Immediately an exothermic reaction ensued and within 2 minutes the reaction mixture set up to a yellow solid. An additional 1000 ml of ethanol was added, the reaction mixture was heated at reflux for 1 hour with stirring, and then cooled to room temperature. The product was filtered and dried in vacuum at room temperature, yielding 402.5 l g (94% of theory) of N,N'-biscinnamal-4,4'-methylene dianiline, m.p. 162.5°–163.5° C.

Analysis Calculated: C: 87.29; H: 6.14; N: 6.57; Found: C: 87.03; H:6.22; N: 6.53.

EXAMPLE 3

By essentially following the procedure of Example 2, but by substituting for 4,4'-methylene dianiline, an equivalent amount of the following diamines, the following N,N'-biscinnamal derivatives of diamines are obtained:

| Diamine | Mp of N,N'-biscinnamal Derivatives |
| --- | --- |
| Ethylene diamine | 109° C |
| 4,4'-diaminotriphenylmethane | 156° C |
| 4,4'-oxydianiline | 210° C |
| p-phenylene diamine | 224° C |

In a similar manner, N,N'-biscinnamal derivatives of the following diamines are obtained:

4,4'-methylenebis (o-chloroaniline)
4,4'-thiodianiline
4,4'-sulfonyldianiline
2-diphenylamino-4,6-bis(m-aminoanilino)-s-triazine.

EXAMPLE 4

By essentially following the procedure of Example 2 and substituting for the trans-cinnamaldehyde an equivalent amount of the following α,β-unsaturated aldehydes and ketones, Schiff bases of 4,4'-methylene dianiline and of the following α,β-unsaturated aldehydes and ketones are obtained:

(a) acrolein
(b) crotonaldehyde
(c) β-(2-furyl)acrolein
(d) o-nitrocinnamaldehyde
(e) benzalacetone
(f) mesityl oxide.

EXAMPLE 5

Citraconic anhydride (89.6 g, 0.8 mole) followed by 70 ml of dimethylformamide (DMF) was added to a stirred solution of 4,4'-methylene-di-o-chloroaniline (267 g, 1 mole) in DMF (450 ml) in a nitrogen atmosphere at room temperature. The mixture was stirred for 45 minutes. A slurry of 3,3',4,4'-benzophenone tetracarboxylic dianhydride (193 g; 0.6 mole) in DMF (300 ml) was then added and the polyamic acid was allowed to form overnight. Imidization was effected through addition of acetic anhydride (677 ml) followed by pyridine (222 ml) and stembath heating for 4 hours. Coagulation from water in a Waring blender, filtration, resuspension in water, filtration and vacuum over drying at 90° C for 24 hours afforded a green-gray powder; 450 g (98% yield) softening point 195°–200° C.

EXAMPLE 6

To a solution of 4,4'-methylenedianiline (19.8 g; 0.1 mole) in dimethylformamide (40 ml) was added citraconic anhydride (11.2 g; 0.1 mole) followed by dimethylformamide (5 ml). The solution was allowed to stir for 1 hour under nitrogen. A slurry of 3,4, 3',4'-tetracarboxylic benzophenone dianhydride (BTDA) (16 g; 0.05 mole) in dimethylformamide (25 ml) was then added and the resulting solution (40% solids) was allowed to stir for about 16 hours under nitrogen, yielding a DMF solution of the polyamic acid.

In a similar manner, polyamic acids are obtained from equivalent amounts of citraconic anhydride and of the following combinations of diamines and dianhydrides:

(a) 4,4'-thiodianiline and 3,4,3',4'-benzophenone tetracarboxylic acid dianhydride
(b) 4,4'-sulfonyldianiline and pyromellitic dianhydirde
(c) 2-diphenylamino-4,6-bis(m-aminoanilino)-s-triazine and bis-(3,4-dicarboxyphenyl)ether dianhydride
(d) 4,4'-diaminodiphenylmethane and 3,4, 3',4'-benzophenone tetracarboxylic acid dianhydride.

EXAMPLE 7

An equimolar mixture of N,N'-biscinnamal-p-phenylenediamine and 4,4'-methylene dianiline-biscitraconimide was heated at 190° C. The resin set up within 5 minutes with conversion of over 905 of the Schiff-base and formation of a linear 1:1 adduct that was completely soluble in hot N,N-dimethylformamide. The degree of conversion of the Schiff base was determined by ultraviolet spectroscopy.

EXAMPLE 8

Equimolar quantities of N,N'-biscinnamal ethylenediamine and 4,4'-methylene dianiline-bis-maleimide were blended at room temperature. The mixture melted at 100° C and gelled within 2-3 minutes at 125° C. The resin blend was very soluble in ketonic solvents. Solutions with 70% solids content in acetone or methyl ethyl ketone were prepared.

EXAMPLE 9

An equimolar mixture of N,N'-biscinnamal 4,4'-methylene dianiline (molecular weight 246.6) and 4,4'-methylenedianiline biscitraconimide (MW 386.4) was heated at 145° C for 5 minutes. The resulting resin showed the following properties:
Softening temperature ca. 140° C
Solubility > 50% solids in chloroform
Gel time 16 min. at 145° C; 5 min. at 190° C
$Tg$ (after cure at 250° C for 30 min.) = 208° C
$Tg$ (after postcure at 350° C for 30 min.) = 242° C
Weight retention after isothermal aging at 260° C (500° F) for 500 hours was 68%.

EXAMPLE 10

By essentially following the procedure of Example 9 and substituting for 50 mole percent of the N,N'-biscinnamal-4,4'-methylenedianiline an equivalent amount of N,N'-biscinnamal-p-phenylene diamine, the resulting resin showed a $Tg$ (after cure at 350° C for 30 minutes) of 255° C.

EXAMPLE 11

A solid resin mixture prepared from N,N'-biscinnamal-4,4'-methylenedianiline and 4,4'-methylenedianiline-bismaleimide in molar ratio of 1:2 had the following properties:
Softening point < 140° C
Solubility > 50% solids content in 1,2-dichloroethane or tetrahydrofuran
Gel time 15 minutes at 145° C
$Tg$ (after cure at 200° C for 45 minutes ) = 255° C
$Tg$ (after post-cure at 350° C for 30 minutes) = 300° C After isothermal aging at 260° C (500° F) this resin showed 56% weight retention.

EXAMPLE 12

A solid resin mixture prepared from N,N'-biscinnamal-4,4'-methylene dianiline and 4,4'-methylene dianiline-biscitraconimide in molar ratio of 1:2 had the following properties.
Softening temperature 140° C
Solubility > 50% in chloroform, or tetrahydrofuran
Gel time 15 min. at 145° C; 5 min. at 190° C
$Tg$ (after cure at 200° C for 100 min.) = 215° C
$Tg$ (after postcure at 350° C for 30 min.) = 317° C
On isothermal aging at 260° C (500° F) for 500 hours this resin showed 62% weight retention.

EXAMPLE 13

A laminating varnish was prepared by heating a mixture of 107 g (0.25 moles) of N,N'-biscinnamal-4,4'-methylene dianiline, 193 g (0.5 moles) of 4,4'-methylene dianiline-biscitraconimide and 750 g of chloroform at reflux for 16 hours. Fiberglass prepregs obtained from this varnish were B-staged at 60° C for 1 hour, press laminated at 177° C (350° F) for 1 hour and postcured for 3 hours at 235° C (450° F). The resulting laminate had the following properties:

| Resin content 29% | | % retention of R.T. flex strength |
|---|---|---|
| Flex. Strength | | |
| At room temp. | $77.3 \times 10^3$ psi | 100% |
| At 450° F | $51.2 \times 10^3$ psi | 66% |
| At 500° F | $40.3 \times 10^3$ psi | 52% |
| Flex. Modulus | | |
| At room temp. | $2.87 \times 10^6$ psi | |
| At 450° F | $2.61 \times 10^6$ psi | |
| At 500° F | $1.90 \times 10$ 6 psi | |

Additional laminates (resin content 36%, void content 1%) were aged isothermally at 260° C (500° F), and showed the following flexural strength values:

| | Flexural Strength | Flexural Strength Retention |
|---|---|---|
| After 0 hrs. | $60.5 \times 10^3$ psi | 100% |
| 100 | $48.8 \times 10^3$ psi | 81% |
| 250 | $35.0 \times 10^3$ psi | 58% |
| 500 | $26.1 \times 10^3$ psi | 43% |
| 750 | $25.7 \times 10^3$ psi | 43% |

The following test methods were employed:

| Resin content | ASTM D 2584 |
|---|---|
| Void content | ASTM D 2734 |
| Flexural strength | ASTM D 790 |
| Flexural modulus | |

EXAMPLE 14

Polyamic Acid-Prepolymers with α,β-Unsaturated Schiff Base End Groups

To a stirred solution of a diamine in N,N'-dimethylformamide was added portionwise at room temperature a calculated quantity of solid aromatic dianhydride. The resulting mixture was stirred for 3 hours at room temperature; then an α,β-unsaturated aldehyde or ketone was added and stirring was continued for 1 hour. The concentrations of reactants were chosen to yield a prepolymer solution with 40% solids.

A prepolymer solution was thus prepared from 4,4'-methylene dianiline, 3,3',4,4'-benzophenonetetracarboxylic dianhydride and cinnamaldehyde in molar ratios of 3:2:2, respectively (formula wt. ≈ 1500). From the resulting solution films were cast and cured by heating at 300° C for 1 hour. The resulting polymer had a glass transition temperature of 280° C, tensile strength 7600 psi, elongation 2.2%, modulus 400,000 psi. It showed 88% weight retention after isothermal aging at 300° C for 300 hours.

The glass transition temperature of this polymer was raised to >350° C upon postcuring at 350° C under an inert atmosphere.

EXAMPLE 15

By essentially following the procedure of Example 14 but using the 4,4'-methylene dianiline, 3,3',4,4'-benzophenonetetracarboxylic dianhydride and trans-cinnamaldehyde in molar ratios of 5:4:2, respectively (formula weight ≈ 3000) there were obtained flexible films with Tg = 260°, tensile strength 7000 psi, elongation 1,8%, modulus 400,000 psi. The polymer showed 90% weight retention after isothermal aging at 300° C for 300 hours.

EXAMPLE 16

By essentially following the procedure of Example 14 and substituting for the cinnamaldehyde an equivalent amount of chalcone (=benzalacetophenone), there was obtained a film which showed 88% weight retention after isothermal aging at 300° C for 300 hours.

EXAMPLE 17

Azadiene Capped Imidized Polyimide from 4,4'-Methylene di-o-Chloroaniline; 3,3',4,4'-Benzophenone Tetracarboxylic Acid Dianhydride; and Trans-Cinnamaldehyde (3:2:0.5)

To a solution of 200.4 g (0.75 moles) of 4,4'-methylene di o-chloroaniline in 250 g of tetrahydrofuran was added portionwise 161.1 g (0.5 moles) of 3,3',4,4'-benzophenonetetracarboxylic acid dianhydride and 150 g of tetrahydrofuran. The mixture was stirred overnight at room temperature, then heated at 50° C for 2–3 hours yielding a clear solution. After adding a solution of 16.5 g (0.125 mole) of trans-cinnamaldehyde in 50 g of tetrahydrofuran, the reaction mixture was heated at reflux for 3 hours. The solvent was distilled off and the and then further heated in a vacuum oven for 6 hours at 160° to 175° C, yielding 318.3 g (89%) of prepolymer as an orange brown solid.

EXAMPLE 18

Azadiene Capped Imidized Polyimide from 4,4'-methylene di-o-chloroaniline; 3,3'4,4'benzophenone Tetracarboxylic Acid and Dianhydride; and Trans-Cinnamaldehyde (3:2:1)

To a solution of 480.9 g (1.8 moles) of 4,4'-methylene di-o-chloroaniline in 1300 ml of N,N-dimethylformamide was added portionwise at room temperature 386.7 g (1.2 moles) of 3,3'-4,4'-benzophenone tetracarboxylic dianhydride. The solution was stirred for 18 hours at room temperature; then 79.3 (0.6 moles) of transcinnamaldehyde and an additional 100 ml of N,N-dimethylformamide was added.

The reaction mixture was heated for four hours at 135°–142° C while water and some of the solvent were distilled off. The reaction mixture was cooled to room temperature, and poured into 10 liters of methanol. The resulting precipitate was filtered, washed with 2.3 liters of methanol and dried for 2 days at 162° C, 0.5 mm Hg., yielding 892.8 g (90%) of prepolymer. The product had a volatile content of 1.5% as determined by weight loss on heating at 300° C for 10 minutes.

EXAMPLE 19

One molar equivalent of the prepolymer of Example 18 which contains approximately equimolar amounts of cinnamal- and diprimary amine end groups was mixed with 1, 1.5 and 2 molar equivalents of 4,4'-methylene dianiline bis-maleimide. The mixtures showed the following properties:

| Molar Equivalents of bis maleimide | 1.0 | 1.5 | 2.0 |
|---|---|---|---|
| Resin softening temperature | 190° C | 180° C | 160° C |
| Cure time at 200° C | 5 min. | 5 min. | 5 min. |
| Tg after cure at 200° C for 90 min. | 215° C | 220° C | 232° C |
| Tg after postcure at 350° C for 30 min. | 332° C | 325° C | 345° C |

EXAMPLE 20

Azadiene Capped Imidized Polyimide from 4,4'-Methylene di-o-chloroaniline; 3,3',4,4'-benzophenone Tetracarboxylic Acid Dianhydride and Trans-Cinnamaldehyde (3:2:2)

By essentially following the procedure of Example 18 but employing the 4,4'-methylene di-(o-chloroaniline); 3,3',4,4'-benzophenone tetracarboxylic acid dianhydride; and trans-cinnamaldehyde in molar ratios of 3:2:2, respectively, there was obtained a cinnamal terminated imide prepolymer.

1.0 molar equivalent of the above prepolymer was mixed with 1.0, 1.5 and 2.0 molar equivalents of 4,4'-methylenedianiline bis-maleimide and the following resin properties were determined on the heated solid mixture of prepolymer and the 4,4'-methylene dianiline bismaleimide:

| Molar equivalents of bis maleimide | 1.0 | 1.5 | 2.0 |
|---|---|---|---|
| Resin softening temperature | 200° C | 152° C | 142° C |
| Cure time at 200° C | 5 min. | 5 min. | 5 min. |
| Tg (by Torsional Braid Analysis) after Curing at 200° C for t min. | 257° C / 60 | 240° C / 15 | 240° C / 75 |
| Tg (after postcure at 350° C for 30 min.) | 295° C | 310° C | 310° C |
| Weight retention after isothermal film aging at 300° C for 480 hours for comparison | 71% | 69% | 67% |

In a similar manner, by mixing 1.0 molar equivalent of the above azadiene capped polyimide prepolymer with 1.0, 1.5 and 2.0 molar equivalents of the prepolymer of Example 5 there is obtained a resin with low softening temperature which cures to a hard, infusible product.

EXAMPLE 21

One molar equivalent of the cinnamal terminated imide prepolymer of Example 19 was mixed with 1.0 and 2.0 molar equivalents of 4,4'-methylene dianiline biscitraconimide and the following resin properties were determined.

| Molar equivalents of biscitraconimide | 1 | 2 |
|---|---|---|
| Resin softening temperature | 165° C | 145° C |
| Solubility in tetrahydrofuran | >50% | >50% |
| Tg after curing at 200° C for t minutes | 210° C / 120 min. | — |
| Tg after postcure at 350° C for 30 minutes | 280° C | 302° C |
| Weight retention after isothermal film aging at 300° C for 480 hrs. | 65.0% | 60.2% |

EXAMPLE 22

By essentially following the procedure of Example 5 but using the 4,4'-methylene-di-o-chloroaniline (MOCA), 3,3',4,4'-benzophenonetetracarboxylic acid dianhydride (BTDA), and citraconic anhydride (CA) in the molar ratios shown below the following polyimide prepolymers A through E were obtained. These polyimide prepolymers were mixed with N,N'-biscinnamal 4,4'-methylene dianiline in the molar ratios shown below and the following resin properties were determined on the resulting solid mixtures.

TABLE I

| | Composition of Prepolymer (moles) | | | | |
|---|---|---|---|---|---|
| Prepolymer From | A | B | C | D | E |
| MOCA | 3 | 2 | 2 | 2.5 | 2.5 |
| BTDA | 2 | 1 | 1 | 1.5 | 1.5 |
| CA | 2 | 2 | 2 | 2 | 2 |
| Moles of N,N'-biscinnamal 4,4'-methylene dianiline per mole of prepolymer | 1 | 1 | 0.5 | 0.5 | 1 |
| Softening Temperature | 220° C | 155° C | — | — | — |
| Solubility (Chloroform, tetrahydrofuran) | | Chloroform 30% solids, Tetrahydrofuran 30% solids | | | |
| Gel Time | | 5 Minutes (at 200° C) | | | |
| Tg (after cure at 350° C for 30 minutes) | — | 262° C | 265° C | 267° C | — |
| Weight retention after isothermal film aging at 300° C for 480 hours | — | — | — | 72.3% | 71.8% |

EXAMPLE 23

Azadiene Capped Imidized Polyimide from 4,4'-Methylene di-o-Chloroaniline; 3,3'4,4'-Benzophenone Tetracarboxylic Acid Dianhydride; and Trans-Cinnamaldehyde (3:2:2)

By essentially following the procedure of Example 17 but employing the 4,4'-methylene di-o-chloroaniline, 3,3',4,4'-benzophenone tetracarboxylic acid dianhydride, and trans-cinnamaldehyde in molar ratios of 3:2:2, respectively, there was obtained a cinnamal terminated imide prepolymer (formula weight 1602).

EXAMPLE 24

One molar equivalent of the solid cinnamal-capped prepolymer prepared in Example 23 was mixed with 2 molar equivalents of 4,4'-methylenedianiline bismaleimide (formula weight 358.4). This solid resin mixture was dissolved in tetrahydrofuran to give a laminating varnish with 40% resin solids, which had a viscosity of 50 cp at room temperature.

Fiberglass tape (type 1581-E with A-1100 finish) was impregnated with the varnish to give prepregs with 30% resin solids. The prepregs were heated at 267° F for 1 hour and then fabricated into 12 ply-laminates by heating at 400° F for 1 hour under a pressure of 90 psi.

The laminates contained 29% resin and had the following physical properties:

Flexural strength at 77° F — (ASTM D-790) — 65.7 × $10^3$ psi

Flexural modulus at 77° F — (ASTM D-790) — 2.65 × $10^6$ psi

Short beam shear strength at 77° F — (ASTM D-2344) — 5.25 × $10^3$ psi.

EXAMPLE 26

This example illustrates the use of an azadiene resin in press molding applications:

The solid resin mixture of Example 24 was blended with equal parts by weight of powdered quartz. The resulting molding compound was advanced by heating at 350° F for 5 minutes and then molded at 450° F for one hour under a pressure of 3000 psi. The molding showed the following physical properties:

Flex. strength at room temperature: 6.68 × $10^3$ psi

Flex. strength at 450° F 2.11 × $10^3$ psi

Flx. Modulus at room temperature: 1.32 × $10^6$ psi

Flx. Modulus at 450° F 0.35 × $10^6$ psi

After postcure by heating to 580° F over a period of 22 hours, followed by heating at 580° for 2 hours, the following physical properties were measured:

Flex. strength at 77° F 7.81 × $10^3$ psi

Flex. strength at 500° F 4.26 × $10^3$ psi

Flex. strength at 550° F 3.92 × $10^3$ psi

Flexural strength at 77° F 1.05 × $10^6$ psi

Flexural strength at 500° F 0.47 × $10^6$ psi

Flexural strength at 550° F 0.42 × $10^6$ psi

EXAMPLE 25 p-Phenylene diamine is reacted with acetic anhydride to form the following compound:

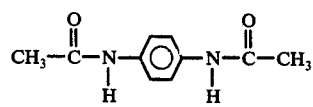

This compound is then reacted with two molar equivalents of trimellitic anhydride to form the following dianhydride compound:

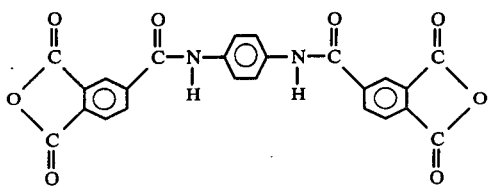

4,4'-diaminodiphenylmethane is reacted with this dianhydride and Nadic anhydride in dimethylformamide and at about 25° C, all compounds being at equivalence to yield the polyamic acid precursor having the formula

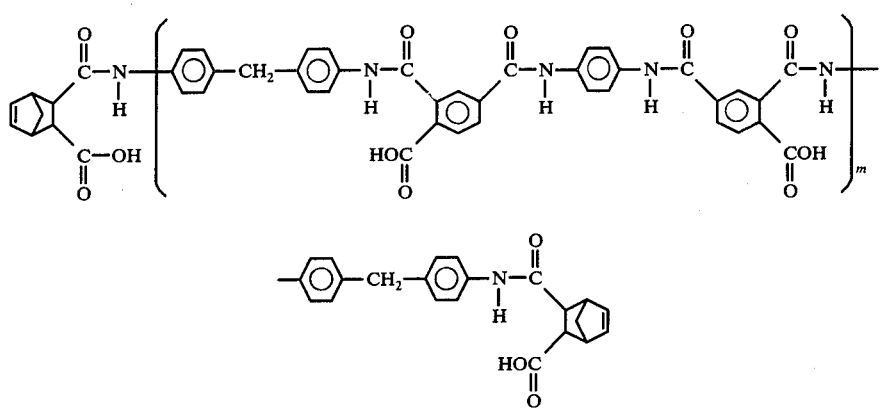

Upon heating the above polyamic acid precursor to temperatures of about 200° C, the following polyamide imide is formed:

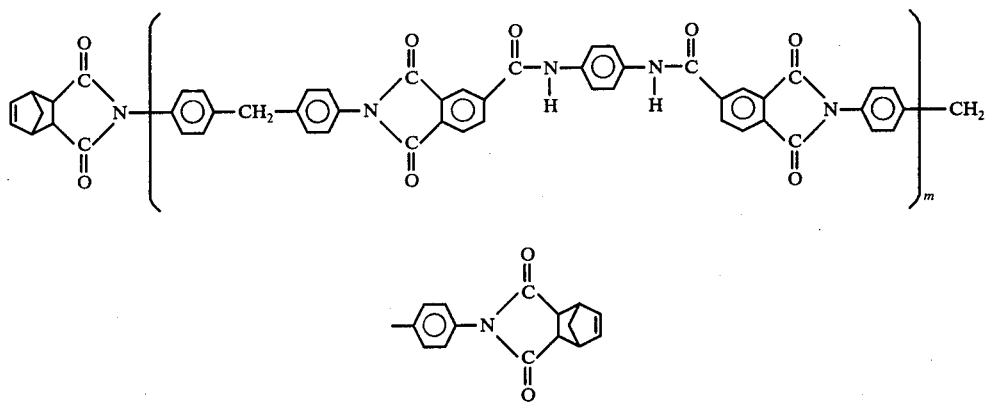

The polyamic acid can also be converted to the polyamideimide by treating the polyamic acid with pyridine/acetic anhydride mixture. The polyamide-imide powder is obtained by coagulation of the polymer solution into water.

The polymer powder when dry mixed separately with each of the following N,N'-biscinnal derivatives at a mole ratio of 2 to 1 respectively (a) N,N'-biscinnamal-4,4'-methylene dianiline
(b) N,N'-biscinnamal-ethylenediamine
(c) N,N'-biscinnamal-4,4'-oxydianiline
(d) N,N'-biscinnamal-p-phenylenediamine
(e) azadiene capped prepolymer of Example 20 will yield resins which may be molded at 260° C for 1 hour at 3000 psi to yield hard, infusible products.

In a similar manner, if one substitutes for the reaction product of p-phenylene diamine and acetic anhydride in the above reaction, the compound resulting from the reaction of 4,4'-diaminodiphenylmethane and acetic anhydride, i.e.,

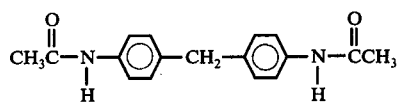

a polyamide imide is obtained having the formula

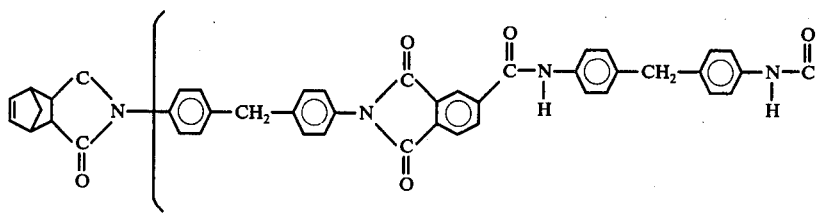

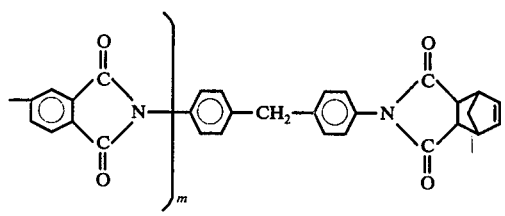

The polymer powder when dry mixed separately with each of the following N,N'-biscinnamal derivatives at a mole ratio of 3 to 1 respectively (a) N,N'-biscinnamal-4,4'-methylene dianiline
(b) N,N'-biscinnamal-ethylenediamine
(c) N,N'-biscinnamal-4,4'-oxydianiline
(d) N,N'-biscinnamal-p-phenylenediamine
(e) azadiene capped prepolymer of Example 20 will yield resins which may be molded at 260° C for 1 hour at 3000 psi to yield hard, infusible products.

EXAMPLE 26

To a 3 liter flask, under a nitrogen atmosphere, is added 98.14 gm of 4,4'-diaminodiphenylmethane, 500 ml dimethylacetamide and 54.17 gm of Nadic anhydride. To the reaction mixture is added 69.49 gm of solid trimellitic acid chloride and 325 ml of dimethylacetamide. Stirring is continued for about 16 hours at 25° C after which 250 ml of acetic anhydride and 340 ml of pyridine is added to the reaction mixture. A clear solution of the polyamideimide is obtained. The polymer is coagulated into water and dried for 20 hours at 70° C under a vacuum of 70 mm of mercury.

Portions of the resin powder are dry mixed separately with each of the following N,N'-biscinnamal derivatives (2 to 1 mole ratio of resin: N,N'-biscinnamal derivative)

(a) N,N'-biscinnamal-4,4'-methylene dianiline
(b) N,N'-biscinnamal-ethylenediamine
(c) N,N'-biscinnamal-4,4'-oxydianiline
(d) azadiene capped prepolymer of Example 20.

Each of the compositions when heated to 210° C for 1 hour give hard, infusible cured products. Each of the compositions when blended with 50% Daper (powdered quartz) may be molded at 450° F for 1 hour at 3,000 psi to hard, infusible products.

EXAMPLE 27

A laminating varnish with 40% resin solids was prepared by refluxing a mixture of 446.4 g (0.3 moles) of the prepolymer of Example 18, 215 g (0.6 moles) of 4,4'-methylenedianiline bismaleimide, 83 g of N,N'-dimethylformamide and 908 g of methyl ethyl ketone for 1 hour. Type 1581-E fiberglass tape with A-1100 finish was impregnated with the varnish, yielding prepregs with 33% resin content, suitable for autoclave lamination at 400° F and 90 psi.

EXAMPLE 28

A laminating varnish was prepared from the prepolymer of Example 17 as follows. A mixture of 300 g of prepolymer, 150 g of 4,4'-methylenedianiline bismaleimide and 450 g of tetrahydrofuran was heated at reflux for 90 minutes. The resulting varnish which contained 50% resin solids was coated onto fiberglass tape (type 1581-E with A-1100 aminosilane finish), to give a prepreg with 31% resin content, which in turn was fabricated into four 12-ply laminates. Processing conditions and physical property data are given in the table below.

| | Laminate Processing and Physical Properties | | | |
|---|---|---|---|---|
| Laminate | A | B | C | D |
| B-Staging Conditions | | | | |
| Temperature | 338° F | 302° F | 302° F | 302° F |
| Time | 1 hour | 1 hour | 1 hour | 1 hour |
| Cure Conditions | | | | |
| Temperature | 400° F | 400° F | 400° F | 400° F |
| Time | 2 hours | 2 hours | 1 hour | 1 hour |
| Pressure | 90 psi | 90 psi | 90 psi | 90 psi |
| Post Cure Conditions | Laminates were heated to 580° F over a period of 22 hours then heated at 580° F for 2 hours. | | | |
| Resin flow | 2% | 1.5% | 3% | 1.3% |
| Resin content in Wt. % (ASTM D-2584) | 31.7 | 30.7 | 30.9 | 30.3 |
| Void Content % (ASTM D-2734) | 0 | 0 | 0 | 0 |
| Short beam shear strength (ASTM D-2344) at 77° F | $6.38 \times 10^3$ psi | $7.70 \times 10^3$ psi | | |
| Short beam shear strength at 550° F | $2.82 \times 10^3$ psi | $2.02 \times 10^3$ psi | | |
| Flexural Strength ASTM D-790 at room temperature (psi) | | $64.7 \times 10^3$ | | |

| Laminate | Laminate Processing and Physical Properties | | | |
|---|---|---|---|---|
| | A | B | C | D |
| at 550° F | | | | $51.1 \times 10^3$ psi |
| Flexural modulus ASTM D-700 at room temperature (psi) | | | $2.39 \times 10^6$ | |
| at 550° F | | | | $1.98 \times 10^6$ psi |

| Variation of Physical Laminate Properties on Isothermal Aging at 550° F | | | | |
|---|---|---|---|---|
| | After 0 hrs. | 100 hrs. | 250 hrs. | 500 hrs. |
| Short beam shear strength ($psi \times 10^{-3}$) at room temperature (ASTM D-2344) | 7.70 | 4.50 | 3.40 | 2.21 |
| at 550° F | 2.02 | 3.51 | 3.31 | 2.52 |
| Flexural strength (ASTM D-790 ($psi \times 10^{-3}$) at room temperature | 64.7 | 41.1 | 33.8 | 28.9 |
| at 550° F | 51.1 | 32.7 | 31.4 | 28.2 |
| Flexural modulus at room temperature ASTM D-790 at 550° F ($psi \times 10^{-6}$) | 2.39 | 2.23 | 2.08 | 2.17 |
| | 1.97 | 1.89 | 1.98 | 1.99 |

EXAMPLE 29

To a DMF solution of 1.00 moles of 2,4-diaminotoluene was added 0.667 moles of 3,3',4,4'-benzophenone tetracarboxylic acid dianhydride with stirring. To this solution was added 0.167 moles of cinnamaldehyde and the resulting mixture was stirred at room temperature for one hour. The resulting solution was added dropwise over a period of 2.5 hours to one liter of refluxing DMF which was slowly distilled for a period of 3.5 hours to yield a concentrated DMF solution of the imide prepolymer. To this solution was added with stirring 0.667 moles of 4,4'-methylene bis phenylmaleimide. Precipitation of this solution by adding it to water gave a yellow resin which when dried and heated formed a clear melt at 155° C and thermoset within 6 minutes after reaching a temperature of 200° C.

EXAMPLE 30

To a solution of 0.430 moles of 4-chloro-m-phenylenediamine in DMF was added with stirring 0.286 moles of 3,3',4,4'-benzophenone tetracarboxylic acid dianhydride. When solution was completed 0.071 moles of cinnamaldehyde was added and the mixture was stirred at room temperature for 1 hour. The resulting solution was added dropwise over a period of 3 hours to 500 ml of refluxing DMF which was slowly distilled to remove the water of imidization. This distillation was continued for 1 hour after the addition was complete. To the solution of the imide prepolymer was added 0.286 moles of 4,4'-methylene bis phenyl maleimide. Precipitation of the solution was carried out by adding it to rapidly stirred water. The precipitated resin was dried and heated on a melting point block. The resin formed a clear melt at 150° C and thermoset within 8 minutes after reaching a temperature of 200° C.

EXAMPLE 31

Glass fabric 181E (A-1100) was impregnated with laminating varnishes of 40% concentration of both resins prepared in Examples 29 and 30. The tacky prepregs were laid up in 12 plies and placed in a nylon vacuum bag and autoclave processed at 400° F for 3 hours. The laminates containing 25% by weight resin were post cured over a 22 hour period up to a temperature of 305° C. The laminates at a temperature of 550° F had a flexural strength of 40,000 psi and a short beam shear strength of 2600 psi.

What is claimed is:

1. A composition of matter consisting essentially of
   (a) a compound of the formula

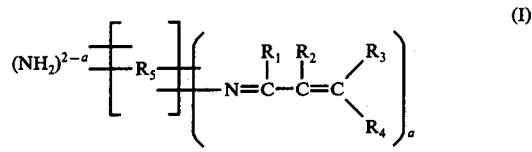

(I)

wherein $a$ is a number from 0.1 to 2, $R_1$, $R_2$, $R_3$ and $R_4$ are independently hydrogen or a monovalent aliphatic, cycloaliphatic or aromatic radical or a combination of such radicals, and $R_5$ is a divalent organic radical containing from 2 to 30 carbon atoms and selected from the group consisting of aromatic, aliphatic, alkylaromatic and cycloaliphatic radicals combinations of these, and radicals with hetero-atom containing bridging groups where the hetero-atom in the bridge is selected from the group consisting of oxygen, sulfur, nitrogen, phosphorus and silicon, and (b) from about 1 to 10 mole equivalents per mole equivalent of (a) of a bis-dienophile selected from the group consisting of (1) a compound of the formula

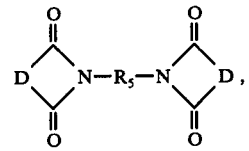

XII (2) a polyamide-acid of the formula

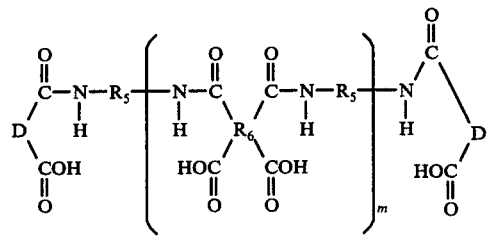

XIII its corresponding polyimide, (3) a polyamide-amide acid of the formula

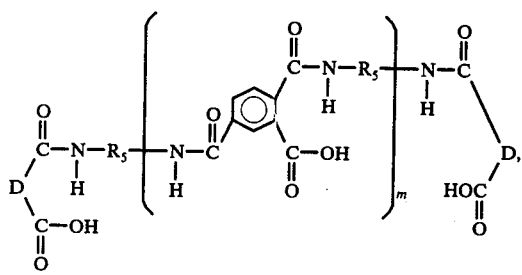

its corresponding polyamide-imide, and
(4) a polyamide-amide acid of the formula

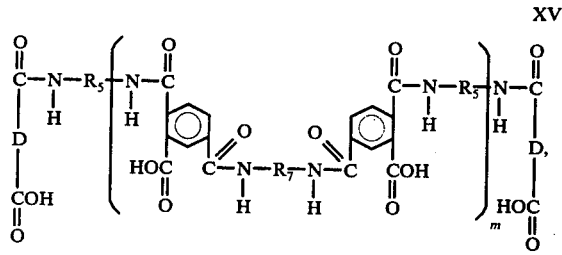

and its corresponding polyamide-imide,
wherein
$R_5$ and $R_7$ are the same or different and each is defined as $R_5$ above,
$R_6$ is a tetravalent aliphatic, cycloaliphatic, aromatic or heterocyclic radical containing at least 2 carbon atoms or a combination of aromatic and aliphatic radicals,
m is a number from 1 to 20, and
D is a divalent radical containing olefinic unsaturation selected from a group having the formula

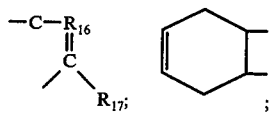

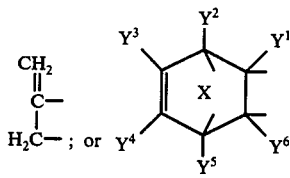

wherein
$R_{16}$ is hydrogen, methyl, bromo or chloro;
$R_{17}$ is hydrogen, bromo or chloro;
$Y^1-Y^6$ inclusive is selected from the group consisting of hydrogen, bromine, chlorine, nitro, phenyl, and alkyl of from 1 to 6 carbon atoms; and
X is carbonyl, oxygen, sulfur, chloro or bromo substituted methylene, alkylidene of from 1 to 6 carbon atoms, and benzylidene.

2. A composition according to claim 1 where in the compound of formula I and in the bis-dienophile $R_5$ and $R_7$ are the same or different and each is an alkylene group containing from 2 to 12 carbon atoms, a cycloalkylene group containing from 4 to 6 carbon atoms; a xylylene group, an arylene group selected from ortho, meta or para phenylene, xylylene, tolylene, biphenylene, naphthylene or anthrylene; a substituted arylene group of the formula

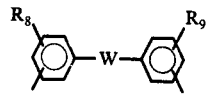

wherein W is a covalent bond, sulfur, carbonyl, —NH, —N—(lower)alkyl, O, S, SS, —N-phenyl, sulfonyl, a linear or branched alkylene group of from 1 to 3 carbon atoms,

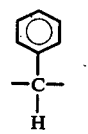

arylene, a dialkyl or diaryl silyl group,

(lower) alkyl, said lower alkyl containing from 1 to 5 carbon atoms, —N=N—, or

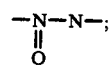

$R_8$ and $R_9$ are independent and
each is hydrogen, halogen, lower alkyl from 1 to 5 carbon atoms, lower alkoxy containing from 1 to 5 carbon atoms, aryl, a group having the formula

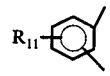

wherein $R_{11}$ is hydrogen, halogen or lower alkyl of from 1 to 5 carbon atoms, or a group having the formula

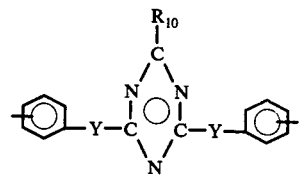

wherein Y is a covalent bond or NH— and $R_{10}$ is phenyl, piperidino, H, diphenylamino, or a di(-lower alkyl)amino group.

3. A composition according to claim 2 wherein the bis-dienophile is selected from the group consisting of
(1) a compound of the formula

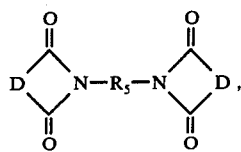

(2) a polyamide-acid of the formula

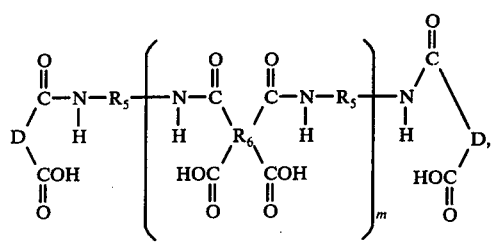

and
(3) a polyimide of the formula

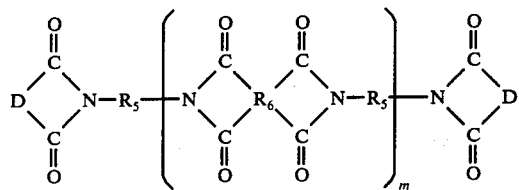

4. A composition according to claim 2 where
(a) in the compound of formula I
$R_1$ is hydrogen or phenyl, $R_2$ and $R_3$ are hydrogen, $R_4$ is phenyl, and $R_5$ is selected from the group consisting of

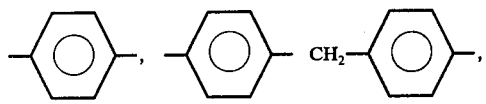

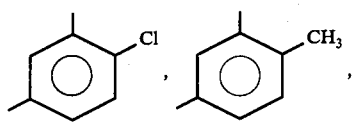

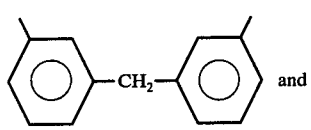

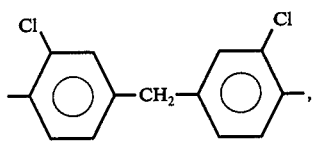

and
(b) the bis-dienophile is the compound of the formula

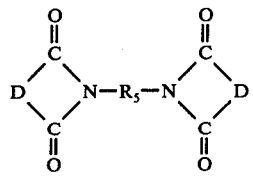

wherein
$R_5$ is as defined under clause (a) above, and D is a group of the formula

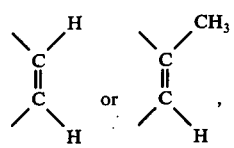

5. A solution of a composition according to claim 1 in a volatile solvent for said composition.

6. A molding powder consisting essentially of the composition according to claim 1.

7. A composition according to claim 2 wherein the bis-dienophile is the compound of the formula

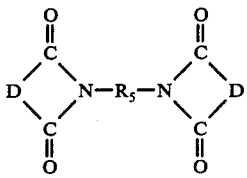

8. The crosslinked resin obtained by heating at 100° to 250° C, the composition according to claim 1.

9. A composition according to claim 4 where (a) is the compound of formula I
$R_1$, $R_2$ and $R_3$ are hydrogen, $R_4$ is phenyl, $R_5$ is a group of the formula

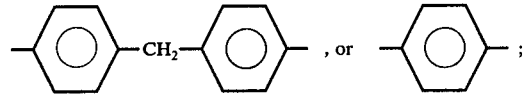

and
(b) in the bis-dienophile $R_5$ is a group of the formula

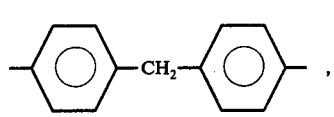

and
D is a group of the formula

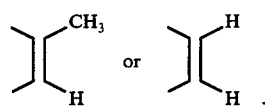

10. A glass fabric or fiber impregnated with the composition according to claim 1.

* * * * *